United States Patent [19]

Hamilton

[11] 4,039,492
[45] Aug. 2, 1977

[54] SYNTHETIC FIBER WATER BASE SURFACE COATING COMPOSITION

[75] Inventor: Willis D. Hamilton, Santa Ana, Calif.

[73] Assignee: Hamilton Materials, Orange, Calif.

[21] Appl. No.: 635,345

[22] Filed: Nov. 26, 1975

[51] Int. Cl.² .......................... C08L 5/00; C08L 89/00
[52] U.S. Cl. ...................... 260/8; 260/17 R; 260/17.4 ST; 260/17.4 CL; 260/42.17
[58] Field of Search ............ 260/8, 17.4 ST, 17.4 CL, 260/42.17

[56] References Cited

U.S. PATENT DOCUMENTS

| | | | |
|---|---|---|---|
| 3,196,122 | 7/1965 | Evans | 260/8 X |
| 3,297,601 | 1/1967 | Maynard et al. | 260/17.4 |
| 3,303,147 | 2/1967 | Elden | 260/8 |
| 3,386,223 | 6/1968 | Wegwerth | 260/8 X |
| 3,878,183 | 4/1975 | Koga et al. | 260/17.4 X |
| 3,891,582 | 6/1975 | Des Marais | 260/17 R |

Primary Examiner—Edward M. Woodberry
Attorney, Agent, or Firm—Fulwider, Patton, Rieber, Lee & Utecht

[57] ABSTRACT

There is disclosed a class of asbestos-free, surface coating compositions useful for finishing of interior building walls or ceilings constructed with wallboard and the like, the so called dry wall construction. The compositions contain, as a substitute for the commonly employed asbestos fibers, a synthetic fiber which is a water-dispersible, thermoplastic polyolefin prepared by solution polymerization with a coordination catalyst and precipitated from the solution under high shear forces. The synthetic fibers can be surface modified by treatment with hydrophilic colloids such as starch or polyvinyl acetate or can bear carboxyl or sulfonate groups to improve their water dispersibility. The fibers are commercially available under the designation SWP from the Crown Zellerbach Company, Camas, Washington. The invention also includes a method for preparation of surface coating compositions including the steps of milling of the water dispersible polyolefin fibers, blending of the fibers into surface coating compositions as a substitute for asbestos fibers therein and remilling of the blended compositions or, alternatively, milling and drying of the synthetic, water-dispersible polyolefin fibers prior to blending of the fibers into the compositions.

13 Claims, No Drawings

SYNTHETIC FIBER WATER BASE SURFACE COATING COMPOSITION

BACKGROUND OF THE INVENTION

1. Field of Invention

This invention relates to surface coating compositions and, in particular, to asbestos-free, dry wall coating compositions.

2. Brief Description of the Prior Art

Surface coating compositions for the common dry wall construction generally require a fibrous filler for working characteristics such as nonleveling and lubricating properties. Heretofore, chopped asbestos fibers have been universally used because of the abundance and superiority of asbestos over other fibers such as fiber glass and wood pulp. Increasing concern of environmental and occupational health hazards has focused attention on the hazardous nature of asbestos since this material has been isolated and identified as the causative factor in various diseases including lung cancer. Significant concentrations of air-borne asbestos fibers occur when the compositions, which are commonly shipped and stored as a dry powder, are blended with water to prepare the coating composition, and when surfaces treated with the compositions are sanded for final finishing of building interiors. The Occupational Safety and Health Administration has prescribed very limited permissible concentrations of air-borne asbestos fibers and these concentrations will, shortly, preclude the use of asbestos fibers in the various dry wall surfacing compositions.

Attempts have been made to eliminate asbestos fibers from surface coating compositions by increasing or modifying the contents of the various other fillers often employed in the coating compositions as typified by U.S. Pat. No. 3,391,453. Despite these attempts, there is generally a need for a fibrous filler substitute for asbestos fibers that will provide surface coating composition having working characteristics and properties that are generally the same as the asbestos-containing compositions, thereby avoiding the retraining or reeducation of the workmen who apply these compositions.

BRIEF STATEMENT OF THE INVENTION

I have now discovered that a fibrous material which is commercially available under the designation SWP from the Crown Zellerbach Corporation, Camas, Wash., serves as an excellent substitute for asbestos fibers as an ingredient in dry wall, surface coating compositions. This fibrous material was developed as a fibrous substitute for wood pulp in the paper industry. Accordingly, it was surprising to discover that the fibrous material could be a successful substitute for the asbestos fiber ingredient in surface coating compositions in view of the knowledge that wood pulp fibers are generally markedly inferior to asbestos fibers in such compositions.

The synthetic fibers of the fibrous material are water-dispersable thermoplastic, polyolefins of high molecular weight which are prepared by solution polymerization using a corrdination catalyst. The fibers are prepared with the desirable physical and mechanical properties by polymerization in solution or precipitation from solution while under high shear forces. The fibers can be surface modified by treatment with a hydrophilic colloid such as starch or polyvinyl acetate or can be carboxylated or sulfonated to increase their water dispersability.

The synthetic fibers can be directly employed as substitutes for the asbestos fibers ingredient in dry wall surfacing compositions although, because the synthetic fibers have a lower bulk density than asbestos fibers, a lesser weight quantity can be used to achieve the same or comparable workability characteristics. The method of this invention comprises the substitution of the synthetic polyolefin fibers for the asbestos fibers in surface coating compositions by preparing the fibers to the desired length, typically by milling of the fibers as commercially obtained, dry blending of the chopped or milled fibers with the remainder of the solid ingredients in the compositions and remilling of the blended ingredients. Other methods for the preparation include the drying of the fibers to a reduced water content prior to blending with the other ingredients. It has been found that the step of drying obviates remilling of the blended ingredients.

DISCLOSURE OF PREFERRED EMBODIMENTS

The surface coating compositions of the invention are prepared using, as a major weight quantity thereof, a granular, finely subdivided solid. Various materials can be used as the subdivided solid including calcium carbonate, calcium magnesium carbonate (dolomite), calcium sulfate, calcium sulfate dihydrate (gypsum), talc, or various alumino-silicates such as clays and the like. The solid material can be employed in a wide size range, depending upon the intended use of the surface coating composition and the surface texture desired. Generally, the solid will be employed at a size range passing a 100 mesh Standard screen. For most uses such as joint compounds, taping compounds and the like, the particles should have approximately 80 to 90 weight percent thereof passing a 325 mesh Standard screen. Generally, coarser particles are employed for ceiling sprays and wall sprays, uses wherein a surface texture is desired. The amount of the particulate solid filler employed in the surface coating compositions will generally be from 40 to about 95, preferably from 75 to about 90, weight percent of the composition.

The surface coating compositions also contain a water soluble binder which can be a water soluble material such as naturally ocurring proteinaceous materials, e.g., soy protein, casein, etc. or a cellulosic binder such as starch and chemically modified starches. Alternatively, a water soluble synthetic polymer such as polyvinyl acetate or copolymers of vinyl acetate with other monomers such as ethylene, styrene, vinylchloride, etc., can be used. The binder can also be a latex of rubber or an elastomer such as a copolymer of styrene and butadiene, isoprene, acrylonitrile, etc. Other useful binders include various water dispersible materials such as slips or suspensions of inorganic binders such as clay, e.g., montmorillonite. Generally, the water soluble or water dispersible binder is employed as an aqueous solution or dispersion in which the dry weight of the solids comprises from 40 to about 60 weight percent. The binder is employed in the surface coating compositions of the invention at a concentration, expressed in dry weight of the total composition, from 1 to about 15, preferably from 3 to about 8, weight percent.

The surface coating compositions of the invention also contain a fibrous filler in sufficient quantities to impart the desired working properties and characteristics thereto such as the desired nonleveling characteristics, lubricity and wet edge time. While these properties have heretofore been satisfied by asbestos fibers, the surface coating compositions of this invention are asbestos-free and contain, as the fibrous filler, a water-dispersible, linear, high molecular weight polyolefin. This fibrous filler is commercially available and is marketed as a substitute for wood pulp fibers in the paper industry by the Crown Zeller-bach Company, Camas, Wash., under the trade designation SWP.

The water-dispersible polyolefin fibers are formed by solution polymerization of mono-olefins such as ethylene, propylene, 1-butene, styrene, etc., with optional amounts of diolefins such as butadiene or isoprene. The solution polymerization is conducted with a coordination catalyst in a hydrocarbon solvent and the desired fibrous structure is achieved by subjecting the polymer under shear stress during its formation to liberate fibers in the manner described in U.S. Pat. Nos. 3,891,610 and 3,849,387. Alternatively, the polymer can be dissolved in a hydrocarbon solution at a temperature above its melt dissolution temperature and precipitated therefrom by evaporation of the solvent under reduced pressure to form a fibrous gel and subjecting the gel to high shear force to separate the fibers therefrom as described in U.S. Pat. Nos. 3,891,499 or 3,882,095. The polymer can also be precipitated from a hydrocarbon solution by the addition of an immiscible liquid, e.g., addition of cyclohexane as a precipitant to a zylene solution of the polymer, while the solution is subjected to high shear force. The polymer can be surface modified to increase its water dispersibility by treatment with hydrophilic colloids such as starch or polyvinyl alcohol as described in U.S. Pat. Nos. 3,743,570 or 3,848,027 or can be carboxylated or sulfonated as described in U.S. Pat. No. 3,787,256. The water-dispersible fibers are of a high molecular weight having an intrinsic viscosity greater than about 1.0 dl/g, corresponding to an average molecular weight greater than 100,000, and preferably greater than about 3.0 dl/g, corresponding to an average molecular weight greater than about 100,000. The diameter of the fibers is generally from 10 to 1,000, preferably from 20 to about 400, microns and the length of the fibers is from 0.05 to about 10, preferably from 0.1 to about 2 millimeters. The fibers have a surface area from 1.0 to about 100, preferably from 10 to about 80, square meters per gram.

The fibrous filler is employed in the surface coating compositions at a concentration from 0.5 to about 20, preferably from 1 to about 10 weight percent.

If desired, optional quantities of various pigments can be employed in the compositions to achieve the desired color of the surface coating. The pigment that is used predominantly for providing a white coloration is titanium dioxide which has a high reflective index and provides a maximum hiding power at low concentrations. Other white pigments that can be used, if desired, include zinc sulfide and lithopone, the latter being a composition of zinc sulfide coprecipitated upon calcium sulfate or barium sulfate crystals. Other inorganic white pigments that can be used include antimony oxide and zinc oxide. When other colors are desired, inorganic pigments can be used such as iron oxide, lead chromate, lead molybdate, zinc chromate, red lead ($Pb_2O_3$), cadmium and zinc sulfide, cadmium sulfoselenide, and chromium oxide. When pigments are employed, the pigment can be present at a concentration from about 0.1 to about 15, preferably from 1 to about 10 weight percent, with the actual concentration selected dependent upon the identity of the pigment and its hiding power.

The surface coating compositions can also, optionally, contain a thickener which is a water-dispersible polymer or gum such as cellulose derivatives including hydroxymethyl cellulose, hydroxyethyl cellulose, carboxymethyl cellulose and salts thereof such as sodium carboxymethyl cellulose; alginates; gum trigacin, xanthan gum, locust bean gum, etc. The thickener enhances the stability of the coating compositions and inhibits settling or precipitation of the solid ingredients. The thickener can be employed at a concentration from about 0.1 to about 10, preferably from about 0.5 to about 5 weight percent.

The coating compositions also contain various working additives to provide the desired properties or characteristics such as a non-leveling property, water retention property, slip or lubricity, and wet edge time. The non-leveling property is the property of the coating compositions to stay on the surface as applied rather than forming a film or level coating. The water retention capability and the wet edge time of the composition relate to the open working time of the coatings after their application and before they acquire a final set, while the lubricity relates to the capability of the compositions to the sprayed or applied without puddling or uneven distribution.

Various additives are employed, alone or in combination, for one or more of these properties including mica, added for lubricity; various clays such as attapulgite to impart thixotropic properties, important for non-leveling and slip characteristics; montmorillonite clays or gums such as xanthan gum, gum tragacin etc., to enhance the lubricity and slip properties of the surface coating compositions.

It has been found that when the synthetic water-dispersible polyolefin fibers are employed as the fibrous ingredient in accordance with the invention, the improvement in water retention and open or wet edge time normally imparted by asbestos fibers is not present to an equal degree. Accordingly, the surface coating compositions of the invention can have a slightly increased content of other water retention agents such as an increased content of clays or additives such as methylcellulose.

The compositions which are prepared, shipped and stored as aqueous dispersions often contain glycol to enhance their water retention. These compositions can have a slightly greater glycol content than normally used with asbestos fiber fillers to provide an equal water retention and wet edge time with the synthetic water-dispersible polyolefin fibers.

Any of the aforementioned working additives can be employed at a concentration that is generally from 0.1 to about 10, preferably from about 0.5 to about 5 weight percent. The actual concentration employed will depend, of course, on the desired working property and value sought in the coating composition.

The surface coating compositions of the invention are prepared by dry blending of the ingredients and, when necessary, milling of the dry blended ingredients to pulverize or subdivide any agglomerates that may have formed during the dry blending process. The synthetic polyolefin fibers used as the fibrous ingredient in the compositions are commonly obtained in the form of mats of non-woven, consolidated fibers approximately one-sixteenth – one-eighth inch in thickness. The non-woven mats of fibers can be broken into particles and milled using a conventional milling equipment such as a hammer mill and the like to prepare the fibers in a loose, fluffed condition.

The fibers, as received and after milling, have a water content which is generally about 50 weight percent and which is sufficient, upon blending with the other dry ingredients, to form agglomerates in the blended composition. If desired, the moisture content of the fibrous filler ingredient can be reduced by drying the fibers, typically by contacting the fibers with a stream of heated air in conventional drying equipment to reduce the water content of the fibers to less than about 10 weight percent, a level at which the fibers do not contribute sufficient moisture to the blended ingredients to cause the formation of agglomerates.

The various dry ingredients can be blended together using any desired sequence of addition and can be blended using conventional mixing equipment such as tumbling barrel or double cone mixers or an air blending system in which the solids are introduced into a vessel supplied with an airstream for stirring and agitating the vessel contents.

In instances when agglomerates are formed after the blending of the solid ingredients, e.g., when the fibrous filler ingredient contributes sufficient moisture to form agglomerates, the blended ingredients can be milled using conventional milling machines such as a hammer mill and the like to insure a fine degree of subdivision of the blended solids.

The following examples will serve to illustrate the practice of the invention and demonstrate results obtainable thereby.

EXAMPLE I

A surface coating composition is prepared by blending together in an air blender the following ingredients in the indicated weight proportions: 97 weight parts of calcium carbonate, 1 weight part powdered attapulgite, 13 weight parts of an emulsion of polyvinyl acetate having a dry solids content of about 60 weight percent, 0.5 weight part of methylcellulose and 0.5 weight part of a water dispersible polyolefin fiber commercially available under the designation SWP. The blended solid ingredients have a size range passing a 100 mesh standard screen size with approximately 85 weight percent thereof passing a 325 mesh standard screen size. The SWP fibers are subdivided into a loose, fluffed condition by passing the fibers through a hammer mill. The blended ingredients are packaged to provide a composition useful upon the addition of water thereto for general purpose wall joint applications including use as taping and coating compositions for drywall joints.

EXAMPLE II

A textured surface treating composition is prepared by blending together the following ingredients in the indicated weight proportions: about 10 weight parts of an emulsion of polyvinyl acetate having a dry solids content of about 60 weight percent, one weight part of titanium dioxide pigment, 74 weight parts of calcium carbonate, 3.5 weight parts of mica, 10 weight parts of a montmorillonite clay and 5 weight parts of a water dispersible polyolefin fiber commercially available under the designation SWP. The polyolefin fibers are hammer milled to a loose, fluffed condition before introduction into the composition. The blended ingredients are packaged and are useful to provide a textured wall spray upon the addition of water thereto. The SWP fibers impart a high degree of nonleveling property and lubricity to the compositions, permitting the compositions to be employed as a spray for imparting a textured appearance to coated surfaces.

EXAMPLE III

A powdered solid composition useful to prepare a spray for the preparation of a highly textured ceiling such as an acoustic ceiling and the like prepared by incorporating into the composition prepared in the preceding example, approximately 5 weight percent of fully expanded, loose polystyrene beads that are fragmented in a hammer mill to an irregular shape with rough surfaces and jagged edges in the manner described in U.S. Pat. No. 3,338,848. The content of the polyolefin fibers in the composition is increased slightly from that of the preceding example to about 7 weight parts, to provide an enhanced nonleveling property to the composition and the content of the granular filler (calcium carbonate) is decreased to about 73 weight parts. The resultant composition, when admixed with water, provides a spray ideally suited for acoustic ceiling application because it possesses high non-leveling and lubricity properties to permit spraying without unevenly coating surfaces.

EXAMPLE IV

Surface coating compositions are prepared by substituting various cellulosic fibers for the synthetic polyolefin fibers of compositions such as described in EXAMPLE I. The cellulosic fibers that are tested, in separate experiments, include wood pulp fibers such as used for Christmas tree flocking, rock wool fibers, chopped cotton fibers and chopped hemp fibers. Another experiment is conducted in which chopped glass fibers are substituted for the polyolefin fibers. Water is added to these compositions and the resultant materials are tested as coatings. It is found that all the compositions do not have adequate nonleveling properties and that the compositions prepared with the hemp and fiber glass fibers also exhibit a marked tendency to flocculate and form agglomerates.

The invention has been described with reference to the presently preferred and exemplified embodiments thereof. It is not intended that the invention be unduly limited by the exemplification of the preferred embodiments. Instead, it is intended that the invention be defined by the ingredients, and the steps, and their obvious equivalents, set forth in the following claims.

What is claimed:

1. A composition for blending with water to form a surface coating composition which comprises from 1 to about 15 weight percent of a water-dispersible binder, from 40 to about 95 weight percent of a finely subdivided particulate filler and from 0.5 to about 20 weight percent of a fibrous filler consisting of a water-dispersible, linear, high molecular weight polyolefin having a surface area between about 1.0 and 100 square meters per gram, a fiber diameter from about 20 to 400 microns and length from about 0.05 to 10 millimeters.

2. The composition of claim 1 including from 0.5 to about 15 weight percent of a pigment.

3. The composition of claim 1 including from 0.1 to about 10 weight percent of a thickening agent comprising a water-dispersible polymer or gum.

4. The composition of claim 3 wherein said thickening agent is a cellulose derivative selected from the class of hydroxymethyl cellulose, hydroxyethyl cellulose, carboxymethyl cellulose and salts thereof.

5. The composition of claim 3 wherein said thickening agent is a gum selected from a class of gum trigacin, xanthan gum and locust bean gum.

6. The composition of claim 1 also including a working additive selected from the class of mica and clay.

7. The composition of claim 1 wherein said water soluble binder is an aqueous emulsion of polyvinyl acetate.

8. The composition of claim 1 wherein said binder is an aqueous suspension of a proteinaceous material.

9. The composition of claim 1 wherein said particulate filler is calcium carbonate, calcium magnesium carbonate or calcium sulfate.

10. The method for preparing a powder mixture for admixing with water to provide an asbestos-free, surface coating composition which comprises forming an intimate mixture by blending together the following ingredients:

from 1 to about 15 weight percent of a water-dispersible binder;

from 40 to about 95 weight percent of a finely subdivided particulate filler; and from 0.5 to about 20 weight percent of a fibrous additive consisiting of a water-dispersible, linear, high molecular weight polyolefin having a surface area between about 1.0 and 100 square meters per gram, a fibrous structure with a fiber diameter from 20 to about 400 microns and length from about 0.05 to 10 millimeters.

11. The method of claim 10 including the step of adding from 0.1 to about 10 weight percent of mica, attapulgite or montmorillonite clay, natural gum, or cellulose derivative to said powder mixture and adjusting the amount so added to a level to provide the desired workability time to surface coatings obtained from surface coating compositions obained therefrom.

12. The method of claim 10 including drying said fibrous additive to a moisture content less than about 10 weight percent before incorporating it in said powder mixture.

13. The method of claim 10 including the step of milling said powder mixture to subdivide agglomerates therein.

* * * * *